United States Patent [19]

Feder

[11] Patent Number: 4,770,644
[45] Date of Patent: Sep. 13, 1988

[54] DISCONNECTABLE MULTIPOLE CONNECTOR, ESPECIALLY FOR USE OF TRANSMISSION OF ELECTRICITY BETWEEN MOTOR VEHICLES AND TRAILERS

[76] Inventor: Emil Feder, Hannoversche Strasse 12, D-3501 Niestetal-Sandershausen, Fed. Rep. of Germany

[21] Appl. No.: 922,237

[22] Filed: Oct. 23, 1986

[30] Foreign Application Priority Data

Dec. 23, 1985 [DE] Fed. Rep. of Germany ....... 3537944

[51] Int. Cl.$^4$ ............................................. H01R 29/00
[52] U.S. Cl. ...................................... 439/166; 439/35; 439/174
[58] Field of Search ................... 439/34, 35, 166, 171, 439/179, 312, 332, 609, 675, 680

[56] References Cited

U.S. PATENT DOCUMENTS

| 1,901,040 | 3/1933 | Peroni et al. | 439/669 |
| 2,723,380 | 11/1955 | Howard | 439/34 |
| 4,245,875 | 1/1981 | Shaffer et al. | 439/680 |

Primary Examiner—Eugene F. Desmond
Attorney, Agent, or Firm—Flynn, Thiel, Boutell & Tanis

[57] ABSTRACT

A standard sized multipole connector for the transmission of electricity therethrough, which connector has plural concentric contacts and structure for preventing shorting when connected to a connector not having a concentric array of contacts.

10 Claims, 4 Drawing Sheets

DISCONNECTABLE MULTIPOLE CONNECTOR, ESPECIALLY FOR USE OF TRANSMISSION OF ELECTRICITY BETWEEN MOTOR VEHICLES AND TRAILERS

FIELD OF THE INVENTION

This invention relates to a multipole, disconnectable connector for the transmission of electric current, preferably to be used between a towing vehicle and a trailer.

BACKGROUND OF THE INVENTION

In German patent application No. P 34 28 922.4, such a disconnectable connector and its disadvantages have already been described and the invention for the elimination of the disadvantages of this very type has been shown in detail. The connectors of the above mentioned application are of the kind which, according to currently valid norms, are intended only for vehicles with a voltage of 6 to 12 volt. Those are commonly to be found on passenger cars and smaller trucks.

Bigger trucks, especially those intended for trailer traffic are, however, operated with a voltage of 24 volts (DIN ISO 1135). Although those are equipped with a seven pin connector, too, they differ from the 6 and 12 volt types as regards their structure.

The present invention relates to disconnectable connectors for 24 volt systems.

Compared to a 6 to 12 volt (DIN ISO 1724) socket with a rigid contact insertion with pins and tubes, the 24 volt type has seven free-standing contact pins, wherein one is thicker in diameter compared to the others in order to provide a coding. Accordingly, the plug of the 24 volt type has a rigid front closing plate in which seven contact tubes are inserted homologously to the socket, whereas in the connector of the 6 to 12 volt version, the respective contacts are free-standing homologously in the form of pins and tubes.

Another peculiarity of the 24 volt version consists in the fact that there is one socket on the motor vehicle as well as one on the trailer which, if required, is being connected by means of a cable with a plug at each of its ends.

Of course, the necessity of additional contacts between towing vehicles and trailers exists for applications with 24 volt systems as well. At present this problem is solved by installing a special second connector which is different from the normal one in technical and constructive features to avoid confusion. These connectors are known under the names "24 N" (DIN ISO 1185) for the regular connector and "24 S" (DIN ISO 3731) for the additional one.

The disadvantage of using this additional model lies as well in the uneconomic installation, difficult use, as well as in increased costs by using two separate and different sockets. Moreover, two separate connection cables each with two different connectors are necessary.

The present invention provides a modification to the plug and socket of 24 volt systems wherein they show more connectors additional to the existing seven but which are, however, perfectly compatible with the existing connectors. Moreover, it is to be more favorable in terms of production and use than the conventional separate connectors.

BRIEF DESCRIPTION OF THE DRAWINGS

The invention and the solution of the task in question will be explained in the following description and with reference to the drawings, in which.

DETAILED DESCRIPTION

Figure 1:
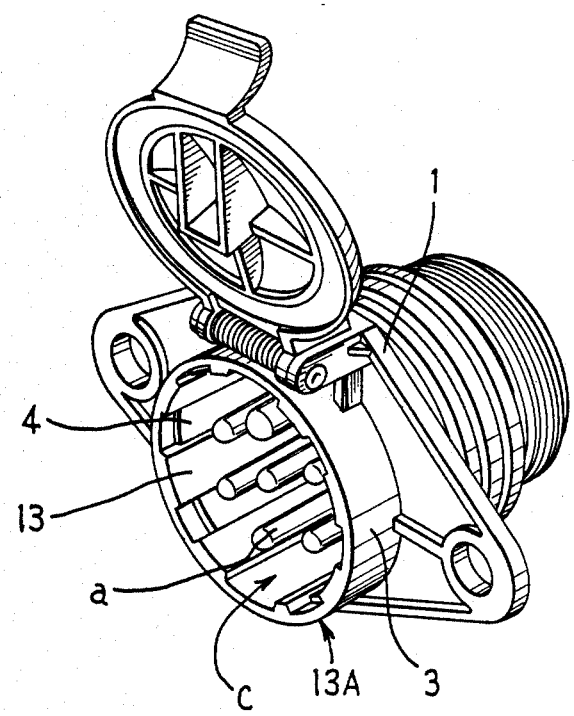
FIG. 1 is a perspective view of a socket or receptacle embodying the invention.
Figure 4:
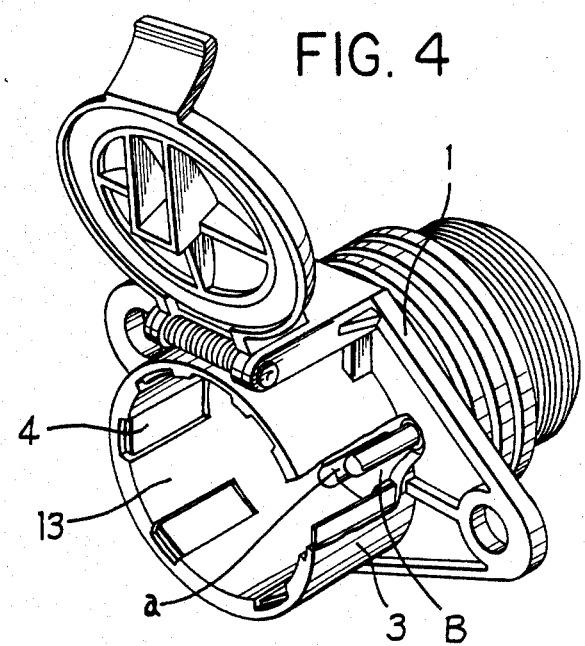
FIG. 4 is a perspective view of a further modification of a socket according to the invention.
Figure 5:
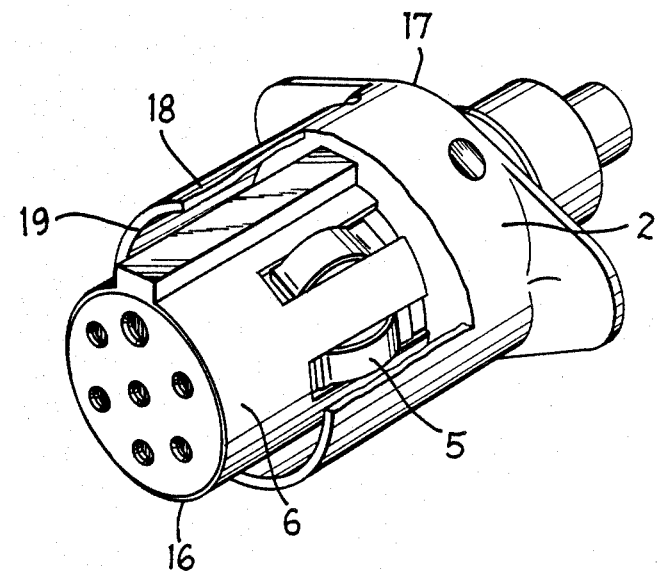
FIG. 5 is a perspective view of a corresponding modification of a plug according to the invention.

In the inner side 13 a cylindrical 13A of a receptacle housing 3, one or more additional contacts 4 are located parallel to the existing contacts or terminal pins (a), which pins are mounted in an array in a receptacle mating face B (see FIG. 4) in a plug receiving recess C. They are located in such a way that they conform to the contour of the inside 13. In FIG. 1 and FIG. 5 of the drawings, the contacts or terminal pins are located backwards which corresponds to a preferred version. For that reason conventional or standard plugs smoothly fit into the socket or receptacle 1 according to the invention without touching the additional contacts 4. This ensures the absolute compatibility of a conventional plug with a socket or receptacle 1 according to the invention having more than seven poles.

Figure 2:
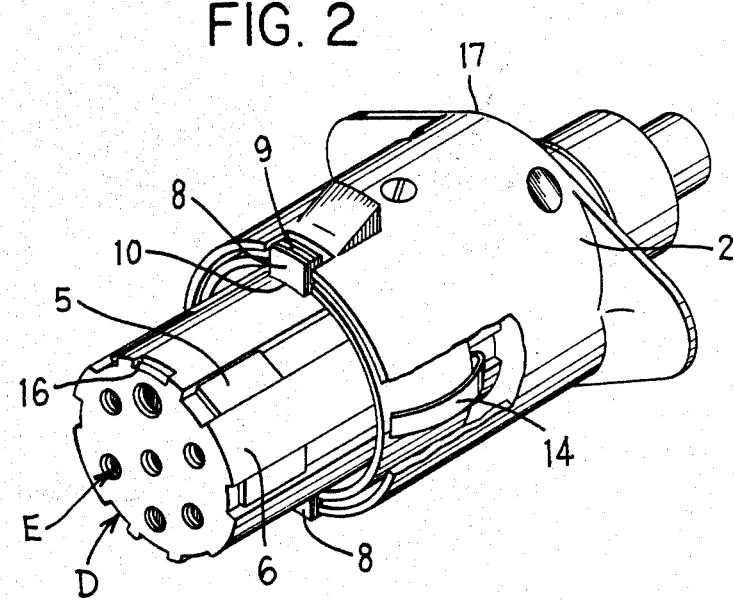
FIG. 2 is a perspective view of a plug embodying the invention in operating position for the socket of FIG. 1.
Figure 3:
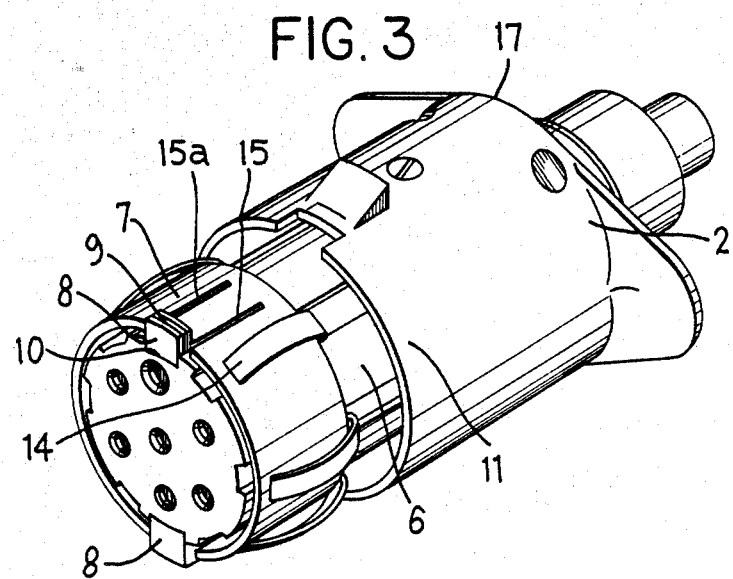
FIG. 3 is a perspective view of a plug in operating position also for the sockets of FIG. 1.

The corresponding plug 2, according to the invention, in FIGS. 2 and 3, however, has a generally cylindrical housing D receivable in the recess C and has an array of bores E opening into a plug mating face. On its outer surface 6 there is provided corresponding contacts 5 located homologously and in an appropriate version. Those contacts can then co-operate with the additional contacts 4 in the socket 1 and transfer electricity. This creates an operating connector with more than seven contacts.

It is, however, a disadvantage of this connector that the additional contacts 5 of the plug 2 are shaped homologously to the socket 1, are situated free-standing and relief upon the surface 6 of the plug 2 and thus, do not comply with the requirements of electric security. When a plug 2 is plugged into a conventional socket, this does not show any effect since the conventional socket does not have any additional contacts to transfer electricity and thus the additional contacts 5 of the plug are inserted neutrally into the socket without showing any effects. The plug at the opposed end of the cable is then without electricity at its additional contacts too. If, however, a plug according to the invention 2 is plugged into a socket 1, the additional contacts 5 of the plug 2 are not insulated, and so it cannot be plugged into a conventional socket made of metal without causing a short circuit. Thus it does not comply with security requirements.

This can be solved by modifying the additional contacts 5 so that they are also located offset or rearward from the front facing surface of the plug 2.

Besides, this arrangement has the advantage that a plug 2 which is transferring electricity can be plugged into a conventional socket without any problems and without creating a short circuit.

In order to have a link between the offset or rearwardly located contact 4 of the socket 1 and the frontwardly offset contact 5 of the plug, another connecting link becomes necessary. An example for a solution according to the invention would be to locate correspondingly dimensioned contact maker 14 in corresponding quantity and design as well as in appropriate modification in such a way that they are connected with each other with the help of adequate devices e.g. a shield or plastic ring 7. The ring 7 with the contact pieces 14—it will hereinafter be called contact ring—is slidably mounted for longitudinal movement on the connector 2 in a movable way with the contact pieces 14 sliding in the groove, which originates from the offset located contact 5.

Between the contact pieces 14 on the contact ring 7 are located one or more springlike tongues 8 which are created out of the material of the ring by means of longitudinal slots 15 and 15a. The springlike tongues 8 are equipped at their front towards the top and towards the bottom with an elevation 9 and 10, with the upper elevation 9 serving as a handle to move the ring 7 in its longitudinal direction, whereas the lower elevation 10 serves as a stopping device preventing unintended rearward movement by gripping a recess in the front of the plug.

On the rear end 17 of the plug 2 a sleeve 11 is designed, which properly encloses the complete contact ring 7 and insulates it towards the outside.

If now a plug according to the invention 2 is inserted into a conventional socket, it is possible to put the contact ring 7 in its backward position (FIG. 2), where it is located neutrally. Since the contacts 5 of the plug and the contacts 4 of the socket are located in a backwards position, then no transmission of electricity results. If, however, the plug 2 is to be inserted into a socket 1, the contact ring 7 is put in its forward position whereat the elevation 10 is resiliently received into a recess or pocket 16 at the front edge and serves as a link between the contact 4 of the socket and the contact 5 of the connector.

Another version of the connector according to the invention is explained with reference to FIGS. 4 and 5. In this further modification, the socket 1 and the plug 2 are constructed in such a way that both of them are mutually compatible with the existing connectors, without, however, requiring additional links, such as the contact ring 7 described above.

For that purpose, the housing 3 is lengthened—preferably by ⅜-1/1 of the length of the existing contact pins—so that it additionally exceeds the existing contact pins (a) by this respective dimension. On the inner side of the housing 3, the additional contacts 4 are located as has already been described—recessed towards the outside—now, however, exceeding the length of the existing contact pins (a) until shortly before the end of the housing 3. This arrangement—recessed towards the outside—ensures that conventional plugs can be connected without any problems with the existing contact pins, without touching the additional contacts 4 on the housing 3. Owing to the construction of the conventional connectors the lengthening of the shell 3 does not have any negative effects on the application of this conventional plug.

The plug 2, however, has on its outside surface, too, additional contacts 5 homologously to the socket, but the contacts 5 are located rearwardly from the front edge 16 by the very length by which the housing 3 has been lengthened. This ensures that the transmission of electricity between the additional contacts of plug and socket only then takes place when both connector and socket are versions according to the invention. If a plug 2 conducting current is plugged into a conventional socket, no transmission of electricity can take place, because, on the one hand, the corresponding additional contacts 5 are located offset in the longitudinal direction of the connector and, on the other hand, the housing 3 of an additional socket is shorter and does not reach the additional contacts 5 of the plug according to the invention and thus the contact 5 cannot touch the housing 3 of the conventional socket.

In order to insulate the additional contacts 5 of the plug 2 towards the outside, they are correspondingly enclosed by a protective sheathing 18 the inner diameter of which is larger than the outer diameter of the housing 3 of the socket. It is possible to locate an appropriate sealing device—in a preferable exemplary version near to the front edge 19 inside or outside the protective sheathing 18. In plugged position, the protective sheathing 18 slides over the housing 3 of the socket 1 and, on the one hand, provides increased stability and, on the other hand, reliable sealing because the two protective shells plugged into each other function in a way similar to a labyrinth seal.

Figure 6:
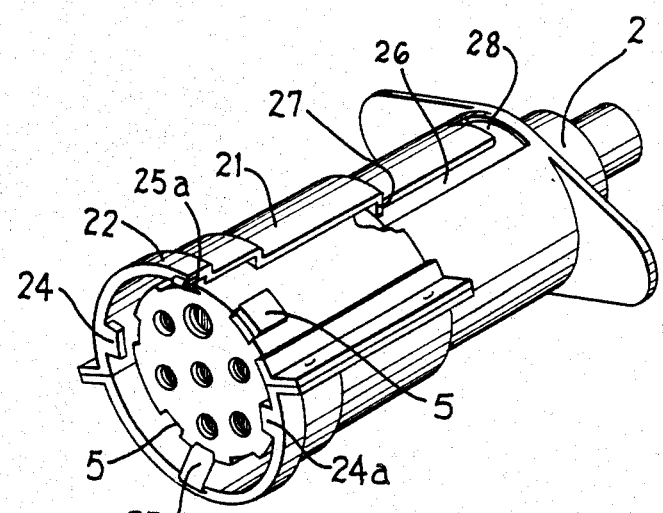
FIG. 6 is a perspective view of another modification of the plug.
Figure 7:
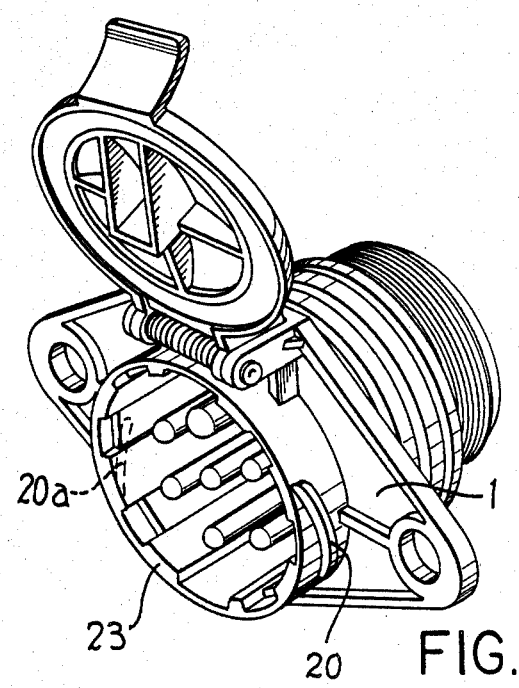
FIG. 7 is a perspective view of a further modification of the socket for the plug of FIG. 6.

A further solution to the provision of a compatible connector according to the invention is shown in FIGS. 6 and 7.

The socket 1, FIG. 7, is equipped with additional contacts like has been described above. It has additional interlocking devices 20 and 20a.

The plug 2, FIG. 6, also has corresponding homologous additional contacts 5. These contacts are, in contrast to the above mentioned plugs 2, not rearwardly located but are spring-loaded and recessed, so that if they are inserted into a socket according to the invention, due to the springloading, the contact is caused directly. In order to protect the recessed additional contacts, a coupling 21, movable on the plug 2, is provided, which is used both as a locking device as well as an insulator. On this coupling 21 on the socket side is designed a two step graded sleeve 22. The first step protects the additional contacts 5 and the second step fits over the rim 23 of the socket (FIG. 7). On this second step collar are provided the retaining noses 24 and 24a which grip in a working position behind the locking devices 20 and 20a of the socket 1. Spring tabs 25 and 25a are located in an appropriate position to keep the coupling in a forward position when not in use. The retaining noses 24 and 24a are located in this manner so that an insertion of the plug into the socket is not possible without bringing them behind the locking devices 20, 20a of the socket.

The plug is furnished with one or more grooves 26 into which a locking means 27 fits. At an outer or rear end, the groove 26 has a right angle segment forming a locking groove 28.

If the plug 2 (FIG. 6) has to be inserted into the socket 1 (FIG. 7), the retaining noses 24, 24a have to be fitted behind the locking devices 20, 20a first, and the entire unit (plug and coupling) has to be turned to the right position. Caused through the steep-plane function of the locking devices 20, 20a, a forward movement is created when rotating the plug. This forward movement presses backwards the spring tabs 25, 25a and allows the coupling 21 to move to the rear to cause the plug to be pushed from the coupling 21 into the socket 1. In case the plug is fully inserted, the appropriate location of the locking device 27 is in the position of the locking groove 28 which then enables the coupling 21 to be rotated further and so causes the positive locking between plug 2 and socket 1. This combination is more preferable since it provides a very effective insulation of the opposite plug in a two plug system as described above.

In case a plug of the last mentioned version is inserted into a conventional socket, nothing happens to the additional contacts 5 because of the lack of additional contacts 4 in the socket. The locking devices 24–20 and 27–28 are not in use in this combination and are ineffectual.

The embodiments of the invention in which an exclusive property or privilege is claimed are defined as follows:

1. In an electrical connector combination adapted for use with a standard receptacle member having a housing with a cylindrical hood defining a plug receiving recess terminating in a receptacle mating face, a plurality of terminal pins mounted in an array in said receptacle mating face and extending into said hood, a plug member having a housing adapted to be received in said plug receiving recess of said receptacle member, said plug member having a plug mating face, and a plurality of bores in an array opening into said plug mating face, said array of terminal pins being aligned with said array of bores, the improvement wherein said cylindrical hood includes on an interior surface a plurality of additional first contacts spaced circumferentially around the interior of said hood, wherein said housing of said plug member has a plurality of external additional second contacts aligned with said first contacts and positioned to electrically contact said first contacts to transfer electricity therebetween, and wherein means are provided for preventing said second contacts from contacting said hood of a standard receptacle member whereat there are no first contacts.

2. The device according to claim 1, wherein said means for preventing said second contacts from contacting said hood of a standard receptacle member whereat there are no first contacts includes an electrical insulator ring slidable between first and second postions on said housing of said plug member to cover and isolate said second contacts from said hood.

3. The device according to claim 2, wherein said electrical insulator ring includes locking means for locking said ring in at least one of said first and second positions.

4. The device according to claim 3, wherein said locking means is defined by a tab formed on said electrical insulator ring and by a pocket formed on said housing, said tab having a raised member thereon receivable in said pocket to lock said ring in said one of two positions.

5. The device according to claim 2, wherein said electrical insulator ring is made of plastic.

6. The device according to claim 1, wherein said means for preventing said second contacts from contacting said hood of a standard receptacle member whereat there are no first contacts includes a lengthening of said cylindrical hood so that said terminal pins and said first contacts are longitudinally offset, and wherein said housing is also proportionately lengthened and said second contacts positioned so that said first and second contacts electrically contact one another when said receptacle member and said plug member are coupled together, a coupling of said plug member to a standard receptacle member with a short hood causing said second contacts to be spaced from said short hood.

7. The device according to claim 6, wherein said plug member includes a sheathing for encircling and covering said second contacts.

8. The device according to claim 1, wherein said means for preventing said second contacts from contacting said hood of a standard receptacle member whereat there are no first contacts includes a collar member encircling said housing of said plug member and supported for movement longitudinally of said housing between first and second positions, said first position shrouding said second contacts and said second position exposing said second contacts, and guide means on said housing for guiding said collar member for movement longitudinally of said housing.

9. The device according to claim 8, wherein said means for preventing said second contacts from contacting said hood of a standard receptacle member whereat there are no first contacts further includes yieldable tab means for locking said collar member to said housing and preventing said collar member from involuntarily moving from said first position to said second position.

10. The device according to claim 9, wherein said means for preventing said second contacts from contacting said hood of a standard receptacle member whereat there are no first contacts further includes retaining noses on said collar member and locking means on an external surface of said cylindrical hood, said retaining noses and said locking means being operatively engageable when said receptacle member and said plug member are placed end to end so that said receptacle mating face is adjacent and opposes said plug mating face, said hood engaging said yieldable tab means to cause said tab means to yield and unlock said collar member from said housing, said collar member moving longitudinally of said housing as said terminal pins move into said bores, said retaining noses and said locking means being relatively angularly moveable to effect a locking of said receptacle member and said plug member together.

* * * * *